US008671250B2

(12) United States Patent
Lee

(10) Patent No.: US 8,671,250 B2
(45) Date of Patent: Mar. 11, 2014

(54) DATA STORAGE DEVICE GENERATING REDUNDANCY FOR DATA PATH PROTECTION OF A PARITY SECTOR

(75) Inventor: Patrick J. Lee, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 249 days.

(21) Appl. No.: 13/327,326

(22) Filed: Dec. 15, 2011

(65) Prior Publication Data

US 2013/0159644 A1 Jun. 20, 2013

(51) Int. Cl.
*G06F 12/06* (2006.01)
*G06F 11/08* (2006.01)

(52) U.S. Cl.
USPC .................. 711/154; 711/202; 714/52

(58) Field of Classification Search
None
See application file for complete search history.

(56) References Cited

U.S. PATENT DOCUMENTS

| | | | |
|---|---|---|---|
| 5,537,421 A | 7/1996 | Dujari et al. | |
| 5,613,066 A | 3/1997 | Matsushima et al. | |
| 5,691,994 A | 11/1997 | Acosta et al. | |
| 5,812,564 A | 9/1998 | Bonke et al. | |
| 5,813,025 A | 9/1998 | Murphy et al. | |
| 5,822,142 A | 10/1998 | Hicken | |
| 5,828,513 A | 10/1998 | Greenberg | |
| 6,035,351 A | 3/2000 | Billings et al. | |
| 6,044,483 A | 3/2000 | Chen et al. | |
| 6,092,231 A | 7/2000 | Sze | |
| 6,112,277 A | 8/2000 | Bui et al. | |
| 6,125,469 A | 9/2000 | Zook et al. | |
| 6,175,686 B1 | 1/2001 | Noda | |
| 6,191,712 B1 | 2/2001 | Still | |
| 6,324,604 B1 | 11/2001 | Don et al. | |
| 6,367,048 B1 | 4/2002 | McAuliffe et al. | |
| 6,385,711 B1 | 5/2002 | Colligan | |
| 6,467,060 B1 | 10/2002 | Malakapalli et al. | |
| 6,532,517 B1 | 3/2003 | Wagner et al. | |
| 6,574,774 B1 | 6/2003 | Vasiliev | |
| RE38,502 E | 4/2004 | Yonemitsu et al. | |
| 6,751,686 B2 | 6/2004 | Takasugi et al. | |
| 6,772,274 B1 | 8/2004 | Estakhri | |
| 6,981,171 B2 | 12/2005 | Hashemi | |
| 6,988,178 B1 | 1/2006 | Shirai et al. | |
| 7,076,603 B1 | 7/2006 | Chheda | |
| 7,099,993 B2 | 8/2006 | Keeler | |
| 7,178,086 B2 | 2/2007 | Hassner et al. | |
| 7,310,765 B1 | 12/2007 | Feng et al. | |
| 7,330,417 B2 | 2/2008 | Billau et al. | |
| 7,461,202 B2 | 12/2008 | Forrer, Jr. et al. | |
| 7,539,924 B1 | 5/2009 | Vasquez et al. | |
| 7,559,009 B1 | 7/2009 | Ricci | |
| 7,562,282 B1 | 7/2009 | Rothberg | |
| 7,574,558 B2 | 8/2009 | Morley et al. | |

(Continued)

*Primary Examiner* — Than Nguyen

(57) ABSTRACT

A data storage device is disclosed comprising a non-volatile memory. A write command is received comprising a first logical block address (LBA) and first user data, and a second LBA and second user data. The first LBA is mapped to a first physical block address (PBA) for addressing a first memory segment. The second LBA is mapped to a second PBA for addressing a second memory segment. First redundancy is generated in response to the first user data, second redundancy in generated in response to the second user data, and parity data is generated in response to the first and second user data. Third redundancy is generated in response to the parity data and in response to at least one of the first LBA and the first PBA and at least one of the second LBA and the second PBA.

20 Claims, 6 Drawing Sheets

(56) References Cited

U.S. PATENT DOCUMENTS

| | | |
|---|---|---|
| 7,647,544 B1 | 1/2010 | Masiewicz |
| 7,840,878 B1 | 11/2010 | Tang et al. |
| 8,006,027 B1 | 8/2011 | Stevens et al. |
| 8,099,651 B2 | 1/2012 | Normoyle et al. |
| 8,122,299 B2 | 2/2012 | Si et al. |
| 8,176,385 B2 | 5/2012 | Uzrad-Nali et al. |
| 8,190,963 B1 | 5/2012 | Wu et al. |
| 8,327,236 B2 | 12/2012 | Ukai |
| 8,397,107 B1 | 3/2013 | Syu et al. |
| 8,433,977 B1 | 4/2013 | Vasquez et al. |
| 2002/0138694 A1 | 9/2002 | Isshiki |
| 2002/0184556 A1* | 12/2002 | Hashemi ............ 714/6 |
| 2003/0147167 A1 | 8/2003 | Asano et al. |
| 2003/0163756 A1 | 8/2003 | George |
| 2003/0202270 A1 | 10/2003 | Ng et al. |
| 2004/0019718 A1 | 1/2004 | Schauer et al. |
| 2004/0103360 A1 | 5/2004 | Mori et al. |
| 2004/0255093 A1 | 12/2004 | Forrer, Jr. et al. |
| 2005/0036381 A1 | 2/2005 | Hassner et al. |
| 2006/0120166 A1 | 6/2006 | Kim et al. |
| 2006/0239089 A1* | 10/2006 | Kawamoto ............ 365/200 |
| 2006/0256624 A1 | 11/2006 | Eggleston et al. |
| 2007/0174678 A1 | 7/2007 | King |
| 2007/0174682 A1 | 7/2007 | King |
| 2007/0186141 A1 | 8/2007 | Hashimoto et al. |
| 2007/0204199 A1 | 8/2007 | Chung et al. |
| 2009/0037793 A1 | 2/2009 | Chuang et al. |
| 2009/0064163 A1 | 3/2009 | Boyd et al. |
| 2009/0150599 A1 | 6/2009 | Bennett |
| 2009/0150637 A1 | 6/2009 | Hattori et al. |
| 2009/0172039 A1 | 7/2009 | Honami et al. |
| 2009/0172250 A1 | 7/2009 | Allen et al. |
| 2010/0011275 A1 | 1/2010 | Yang |
| 2010/0088576 A1 | 4/2010 | Isono et al. |
| 2010/0131723 A1 | 5/2010 | Yorimitsu |
| 2011/0131472 A1 | 6/2011 | Antonakopoulos et al. |

* cited by examiner

DATA STORAGE DEVICE GENERATING REDUNDANCY FOR DATA PATH PROTECTION OF A PARITY SECTOR

BACKGROUND

Data storage devices, such as disk drives and solid state drives are employed in numerous areas such as computer systems (e.g., desktops, laptops, portables, etc.) and consumer devices (e.g., music players, cell phones, cameras, etc.). User data is typically stored in a non-volatile memory, such as a magnetic disk or a non-volatile semiconductor memory (e.g., flash memory). In order to enable defect mapping (mapping out defective memory segments in the non-volatile memory), as well as enable wear leveling in solid state drives, the memory segments are typically accessed indirectly by mapping logical block addresses (LBAs) to physical block addresses (PBAs). That is, host access commands (write or read) comprise an LBA that is mapped to a PBA representing a memory segment, where the PBA may change over time due to relocating from a grown defect, or wear leveling to evenly distribute access to the memory segments.

When accessing a memory segment using LBA to PBA mapping, it is important for the storage device to access the correct memory segment. For various reasons, such as malfunctioning firmware, a data storage device may write/read data to/from the wrong PBA, or write the wrong data to the correct PBA, perhaps because of an error in accessing a cache buffer, or in the LBA to PBA mapping algorithm, or in the mapping of PBA to the memory segment. The prior art has employed various forms of "data path protection" wherein the LBA or the PBA may be used during the write/read operations to ensure the correct memory segment is read and that the memory segment stores the correct data during a read operation. For example, the prior art has suggested to seed an error code with either the LBA or the PBA during writing and reading which helps ensure the correct memory segment is being accessed, and that the correct data was written to the memory segment.

DETAILED DESCRIPTION OF EMBODIMENTS OF THE INVENTION

Figures 1A, 1B:
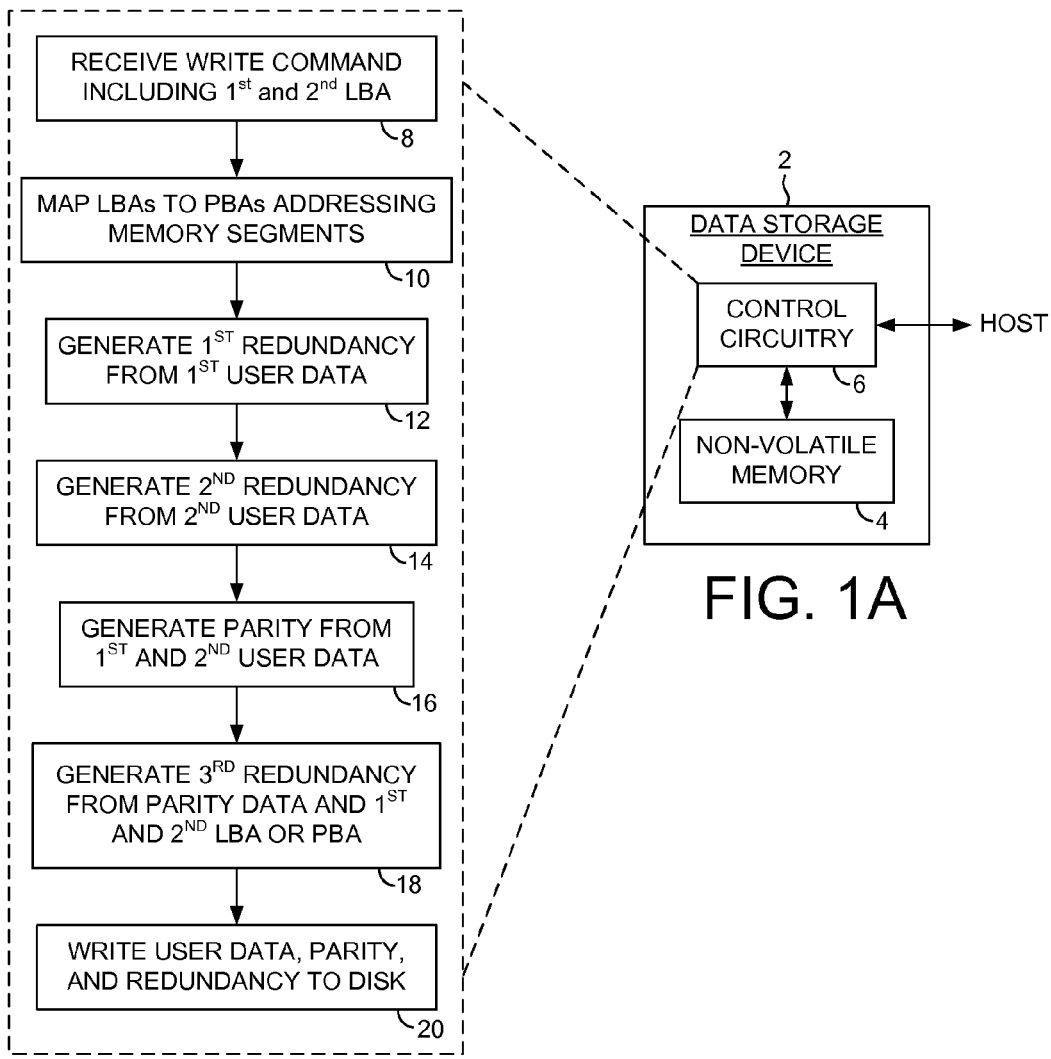
FIG. 1A shows a data storage device according to an embodiment of the present invention comprising a non-volatile memory.
FIG. 1B is a flow diagram according to an embodiment of the present invention wherein data path protection redundancy is generated for a parity sector over data sector block addresses that the parity sector covers.

FIG. 1A shows a data storage device 2 according to an embodiment of the present invention comprising a non-volatile memory 4 comprising a plurality of memory segments. The data storage device 2 further comprises control circuitry 6 operable to execute the flow diagram of FIG. 1B, wherein a write command is received comprising a first logical block address (LBA) and first user data, and a second LBA and second user data (step 8). The first LBA is mapped to a first physical block address (PBA) for addressing a first memory segment, and the second LBA is mapped to a second PBA for addressing a second memory segment (step 10). First redundancy is generated in response to the first user data (step 12), and second redundancy is generated in response to the second user data (step 14). Parity data is generated in response to the first and second user data (step 16). Third redundancy is generated in response to the parity data and in response to at least one of the first LBA and the first PBA and at least one of the second LBA and the second PBA (step 18). The first and second user data and parity data are written to the non-volatile memory and the first, second, and third redundancy are written to the non-volatile memory (step 20).

In the embodiments of the present invention, the parity sector may be used to recover an unrecoverable data sector (memory segment), such as a data sector unrecoverable using an ECC. As described below, the parity sector can be combined with the recoverable data sectors out of a sequence of data sectors in order to recover an unrecoverable data sector. However, due to a malfunction (e.g., firmware error), the control circuitry may not read the correct parity sector. For example, the control circuitry may read the wrong parity sector (or even a data sector) rather than read the correct parity sector. The embodiments of the present invention can detect when this happens by generating the parity sector redundancy for data path protection over the entire sequence of LBAs or PBAs that the parity sector covers. In this manner, if an incorrect sector is read rather than the correct parity sector, the error will be detected to avoid regenerating an incorrect data sector.

Figure 2A:
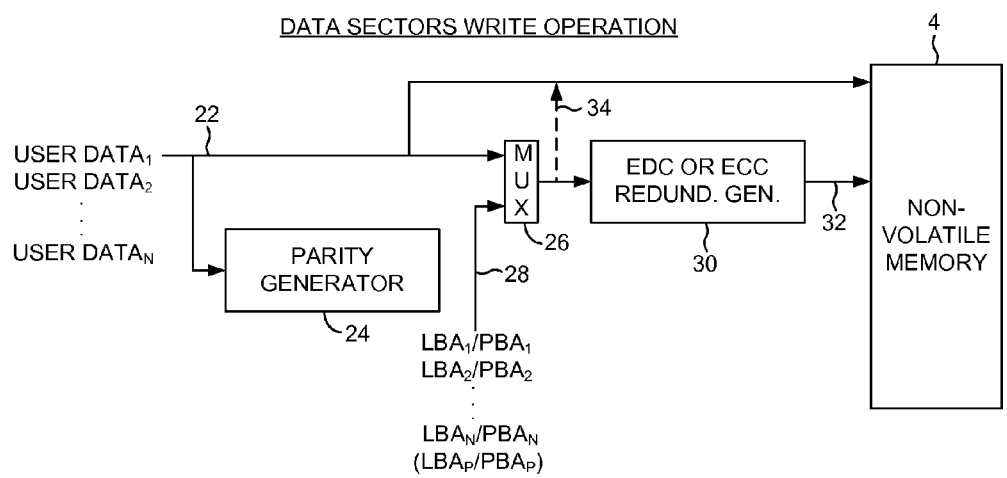
FIG. 2A illustrates a write operation for writing data sectors to the non-volatile memory while generating parity data for a parity sector according to an embodiment of the present invention.

FIG. 2A illustrates a write operation according to an embodiment of the present invention for writing N data sectors to the non-volatile memory 4. As the user data 22 for each data sector is written to the non-volatile memory 4, a parity generator 24 generates parity data over the user data (e.g., by XORing the user data). At the beginning of each data sector, a multiplexer 26 selects one of the corresponding LBA and PBA 28 for input into an error detection code (EDC) or error correction code (ECC) redundancy generator 30, and then selects the corresponding user data 22 as the input to the redundancy generator 30. The redundancy generator 30 generates redundancy 32 over the user data and LBA/PBA of each data sector, and the redundancy 32 is written to the non-volatile memory 4 together with the corresponding user data 22 to form a codeword. In one embodiment, the LBA/PBA of a data sector is processed as part of the codeword, and in another embodiment, the LBA/PBA of a data sector is used to seed the redundancy generator 30 and is therefore not processed as part of the codeword. In the embodiment where the LBA/PBA is processed as part of the codeword, the LBA/PBA may or may not be written to the non-volatile memory 4 as denoted by dashed line 34.

Figure 2B:
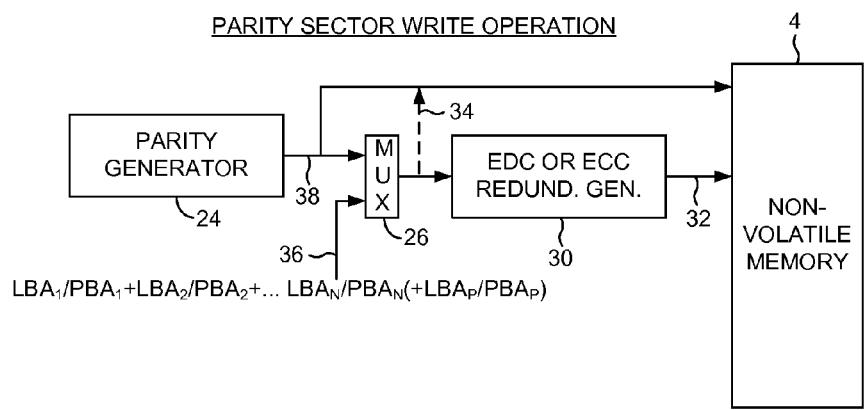
FIG. 2B illustrates writing the parity sector to the non-volatile memory wherein data path protection is generated over the LBA/PBA of the data sectors that the parity sector covers according to an embodiment of the present invention.

FIG. 2B illustrates completion of the write operation wherein the parity sector is written to the non-volatile memory 4. At least one of the LBA and PBA of each data sector are combined (e.g., XORed) to generate metadata 36. The multiplexer 26 selects the metadata 36 as the input to the redundancy generator 30, and then selects the parity data 38 generated by the parity generator 24 as the input to the redundancy generator 30. The parity data 38 and the redundancy 32 are written to the non-volatile memory 4 as a codeword. Similar to the data sectors, the metadata 36 may be processed as part of the codeword (with our without writing the metadata to the non-volatile memory 4), or the metadata may be used to seed the redundancy generator 30 and therefore not processed as part of the codeword.

Figure 3A:
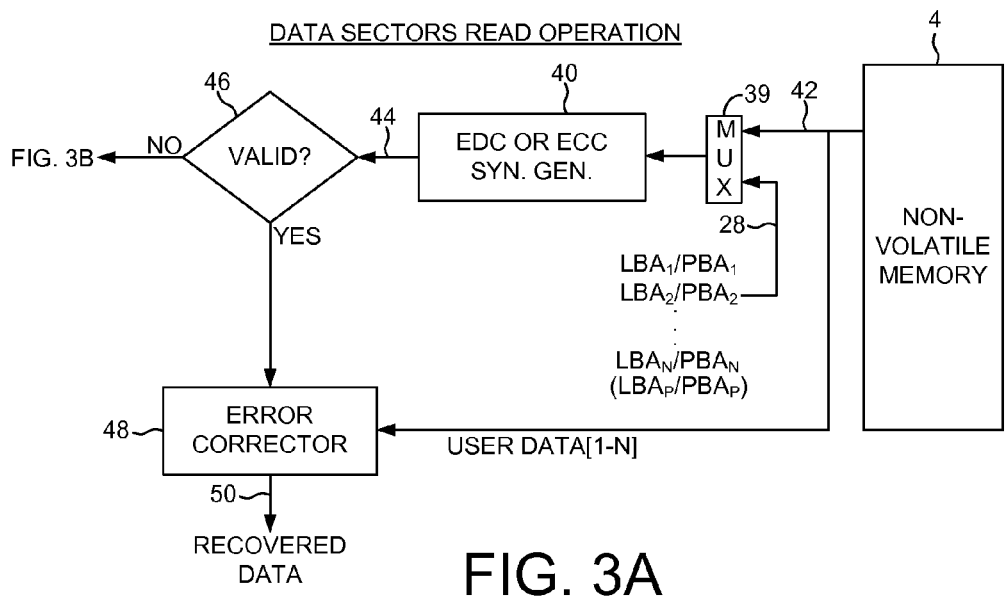
FIG. 3A illustrates a read operation for reading data sectors from the non-volatile memory, including to perform a data path protection check on each data sector according to an embodiment of the present invention.

FIG. 3A shows a read operation wherein one or more of the data sectors are read from the non-volatile memory 4. A multiplexer 39 selects the LBA received with the read command (or the corresponding PBA) 28 as the input to an EDC or ECC syndrome generator 40, and then selects the data 42 read from the non-volatile memory 4 (user data and redundancy) as the input to the syndrome generator 40. An output 44 of the syndrome generator 40 is evaluated 46 to determine whether the data sector is valid. In one embodiment, the data sector may be deemed invalid if the error correction capability of an ECC is exceeded. In another embodiment, the data sector may be deemed invalid based on the data path protection check (i.e., if there is a mismatch in the expected LBA or PBA 28 as detected from the redundancy). In one embodiment, an ECC is used to generate the redundancy for data path correction as well as correct the data sector, where a mismatch in the LBA or PBA 28 will render the data sector uncorrectable (and therefore invalid). In an embodiment where the LBA or PBA 28 is processed as part of the codeword, the data sector may be deemed invalid if the error corrector 48 of the ECC attempts to correct the LBA or PBA 28 part of the codeword. In another embodiment, the codeword may be corrected by the error corrector 48 and then the data path protection check performed using an EDC syndrome generated over the corrected data.

Figure 3B:
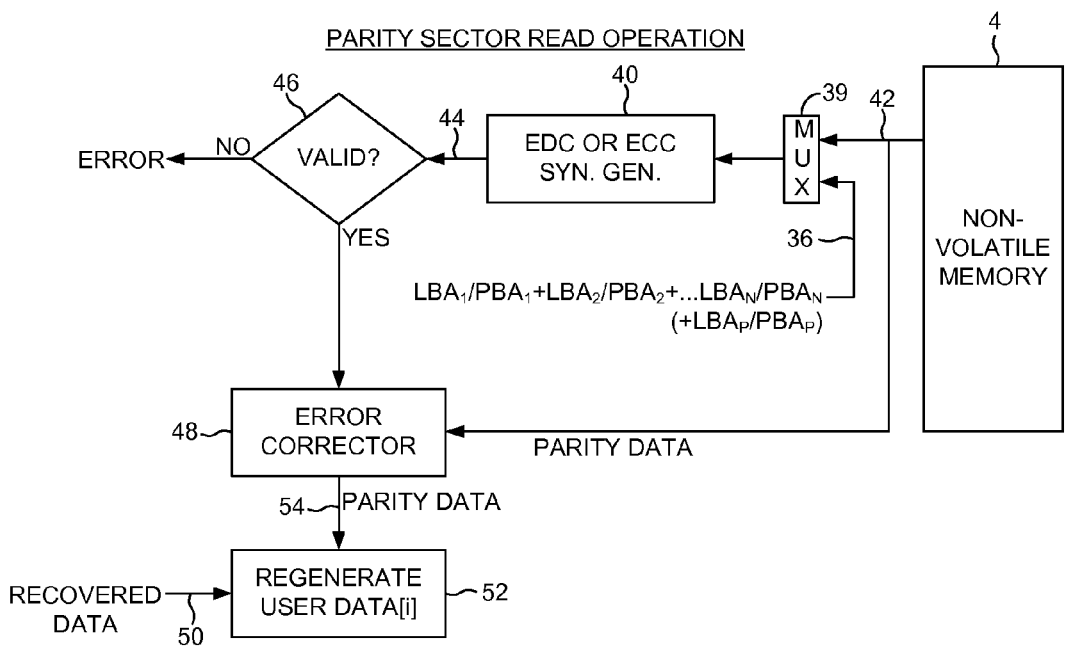
FIG. 3B illustrates reading the parity sector form the non-volatile memory to regenerate an unrecoverable (or unverified) data sector, including to perform a data path protection check on the parity sector according to an embodiment of the present invention.

If one of the data sectors is deemed invalid 46, the remaining data sectors covered by the corresponding parity sector are read from the non-volatile memory 4 and corrected 48 as necessary to generate recovered data 50. The LBA or PBA of each of the data sectors are combined (e.g., XORed) to generate the metadata 36 (FIG. 3B). The multiplexer 39 selects the metadata 36 as the input to the EDC or ECC syndrome generator 40 and then selects the data 42 read from the non-volatile memory 4 (parity data and redundancy) as the input to the syndrome generator 40. The output 44 of the syndrome generator 40 is evaluated 46 to determine whether the parity sector is valid similar to determining whether a data sector is valid as described above. However, for the parity sector the data path protection verifies that the parity sector read from the non-volatile memory 4 is consistent with the metadata 36; that is, the data path protection verifies that the parity sector read from the non-volatile memory 4 was generated over the expected LBA or PBA sequence. If the parity sector fails the data path protection check, it means the control circuitry read the wrong parity sector (or read a data sector) due to a malfunction and an error is returned to the host rather than return miscorrected user data.

In one embodiment, an ECC is used to generate the redundancy for data path protection as well as correct the parity sector, where a mismatch in the metadata will render the parity sector uncorrectable (and therefore invalid). In an embodiment where the metadata 36 is processed as part of the codeword, the parity sector may be deemed invalid if the error corrector 48 of the ECC attempts to correct the metadata 36 part of the codeword. In another embodiment, the codeword may be corrected by the error corrector 48 and then the data path protection check performed using an EDC syndrome generated over the corrected data.

If the parity data sector is deemed valid, then the user data[i] of the unrecoverable data sector is regenerated 52 by combining (e.g., XORing) the recovered data 50 from the recoverable data sectors with the parity data 54 read from the parity sector. Because the parity sector has been verified (passed the data path protection check) the regenerated data sector will be correct. In an alternative embodiment described below, the parity sector is verified by verifying the validity of a regenerated data sector. That is, after a data sector has been regenerated, a data path protection check is performed on the regenerated data. If the regenerated data sector passes the data path protection check, it means that the parity sector must also be valid.

Figure 4A:
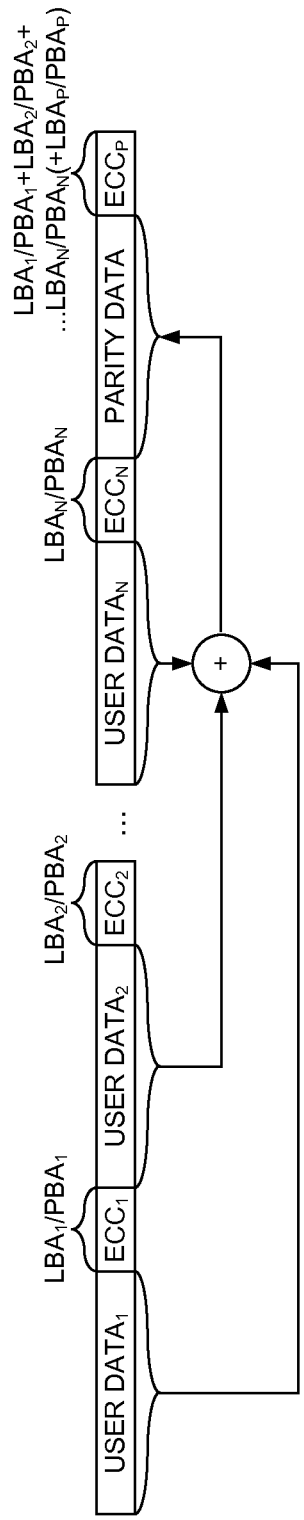
FIG. 4A illustrates a write operation that includes writing the data sectors and parity sector to the disk using data path protection generated using an error correction code (ECC) redundancy according to an embodiment of the present invention.

FIG. 4A illustrates a write operation wherein the redundancy for the data path protection is generated using an ECC redundancy generator. That is, the ECC redundancy for correcting a data sector is generated using the LBA or PBA of the data sector. The user data and corresponding ECC redundancy ($ECC_i$) are written to the non-volatile memory. The user data of each data sector are combined (e.g., XORed) to generate the parity data. The ECC redundancy generator is then seeded with metadata generated over the LBA or PBA of the data sectors (e.g., by XORing the LBAs or PBAs) in order to generate the ECC redundancy (ECCp) for the parity sector as illustrated in FIG. 4A.

Figure 4B:
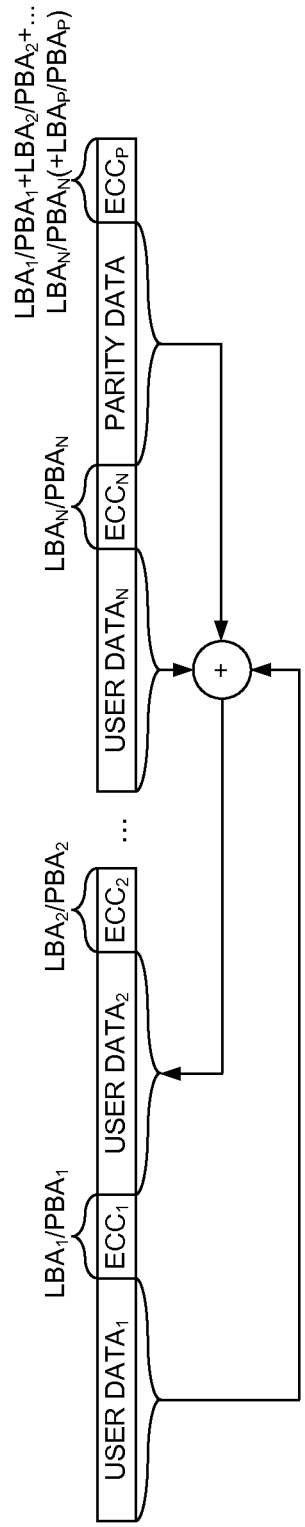
FIG. 4B illustrates a read operation that includes regenerating a data sector using the parity sector after verifying the parity sector is valid using ECC redundancy according to an embodiment of the present invention.

FIG. 4B illustrates a read operation of the data sectors shown in FIG. 4A, wherein the second data sector is uncorrectable using the corresponding ECC redundancy ($ECC_2$). To regenerate the second data sector, the remaining data sectors are read and the parity sector is read. When reading the parity sector, the ECC syndrome generator is seeded with metadata generated over the LBA or PBA of the data sectors (e.g., by XORing the LBAs or PBAs) in order to perform the data path protection check of the parity sector as described above. If the parity sector passes the data path protection check, the parity data is combined with the recoverable data sectors (e.g., XORed) in order to regenerate the second data sector as illustrated in FIG. 4B.

Figure 5A:
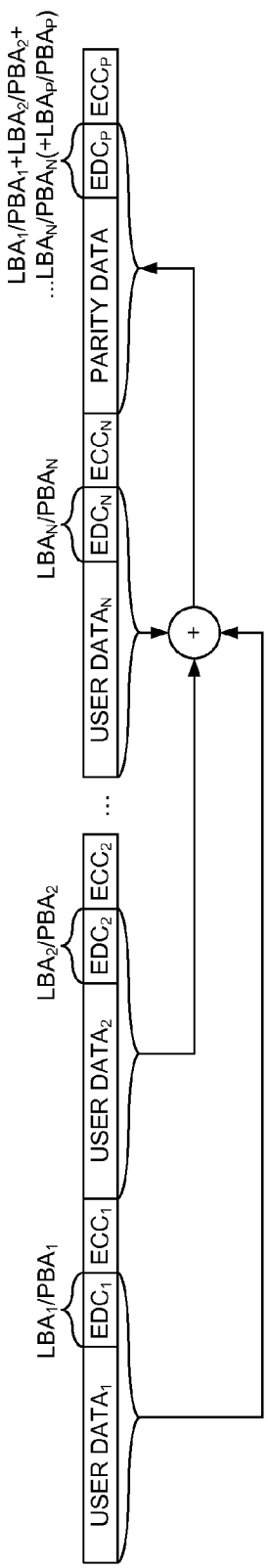
FIG. 5A illustrates a write operation that includes writing the data sectors and parity sector to the disk using data path protection generated using an error detection code (EDC) redundancy according to an embodiment of the present invention.

FIG. 5A illustrates a write operation wherein the redundancy for the data path protection is generated using an EDC redundancy generator. For example, the EDC redundancy generator generates redundancy ($EDC_1$) for the first data sector, and then ECC redundancy ($ECC_1$) is generated over the user data and the EDC redundancy ($EDC_1$). The parity data for the parity data sector is generated by combining (e.g., XORing) the user data of the data sectors and by combining (e.g., XORing) the EDC redundancy (EDC) of the data sectors to generate the EDC redundancy ($EDC_P$) for the parity sector. Alternatively, the EDC redundancy ($EDC_P$) for the parity sector may be generated by combining the LBA or PBA of each of the data sectors into metadata, and then seeding the EDC generator with the metadata. In either case, the EDC redundancy ($EDC_P$) for the parity sector will be the same and will therefore be generated in response to the LBA or PBA of the data sectors as illustrated in FIG. 5A.

Figure 5B:
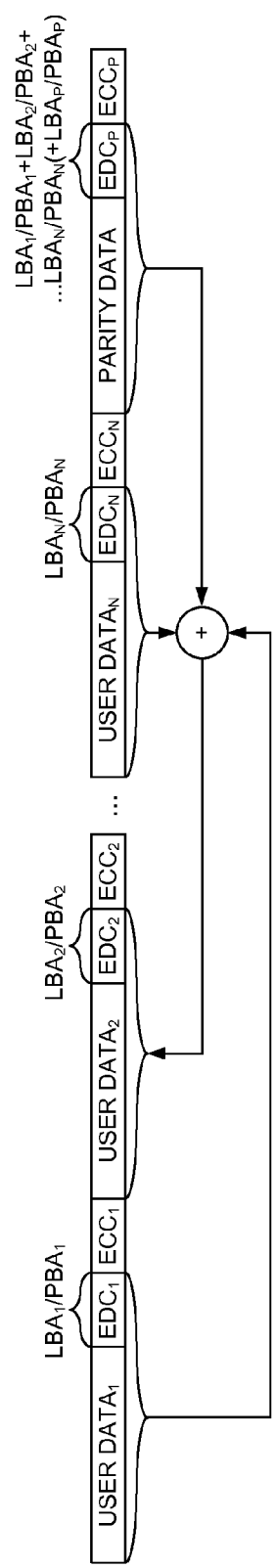
FIG. 5B illustrates a read operation that includes regenerating a data sector using the parity sector after verifying the parity sector is valid using EDC redundancy according to an embodiment of the present invention.

FIG. 5B illustrates a read operation of the data sectors shown in FIG. 5A, wherein the second data sector is uncorrectable using the corresponding ECC redundancy ($ECC_2$). To regenerate the second data sector, the remaining data sectors are read and the parity sector is read. When reading the parity sector, the EDC syndrome generator is seeded with metadata generated over the LBA or PBA of the data sectors (e.g., by XORing the LBAs or PBAs) in order to perform the data path protection check of the parity sector as described above. If the parity sector passes the data path protection check, the parity data is combined with the recoverable data sectors (e.g., XORed) in order to regenerate the second data sector as illustrated in FIG. 5B. In an alternative embodiment, the validity of the parity sector can be checked by performing a data path protection check on the regenerated data sector (the second data sector). In this embodiment, the EDC redundancy ($EDC_2$) for the second data sector is regenerated using the parity sector, and therefore a data path protection check can be performed on the regenerated data sector using the regenerated EDC redundancy ($EDC_2$). If the regenerated data sector does not pass the data path protection check, it means the parity sector is invalid.

Any suitable EDC or ECC may be employed to generate the redundancy to implement data path protection in the embodiments of the present invention. For example, a suitable Cyclic Redundancy Check (CRC) code may be used to generate EDC redundancy, or a suitable Reed-Solomon code may be used to generate ECC redundancy. Other embodiments may employ a Low Density Parity Check (LDPC) code or similar type codes, such as a Turbo code, to generate the ECC redundancy. With a CRC or Reed-Solomon code, the redundancy generator and syndrome generator may be seeded with the LBA or PBA rather than process the LBA or PBA as part of the codeword.

In the embodiments described above, the metadata for data path protecting the parity sector is generated in response to the LBA or PBA of the data sectors that the parity sector covers. In an alternative embodiment, the metadata may be generated in response to the LBA or PBA of the parity sector in addition to the LBA or PBA of the data sectors. This is illustrated in the drawings by showing the LBA or PBA of the parity sector ($LBA_P/PBA_P$) in parenthesis to indicate its inclusion is optional. This embodiment may provide additional data path protection to help ensure the correct parity sector is read from the non-volatile memory.

Figure 6:
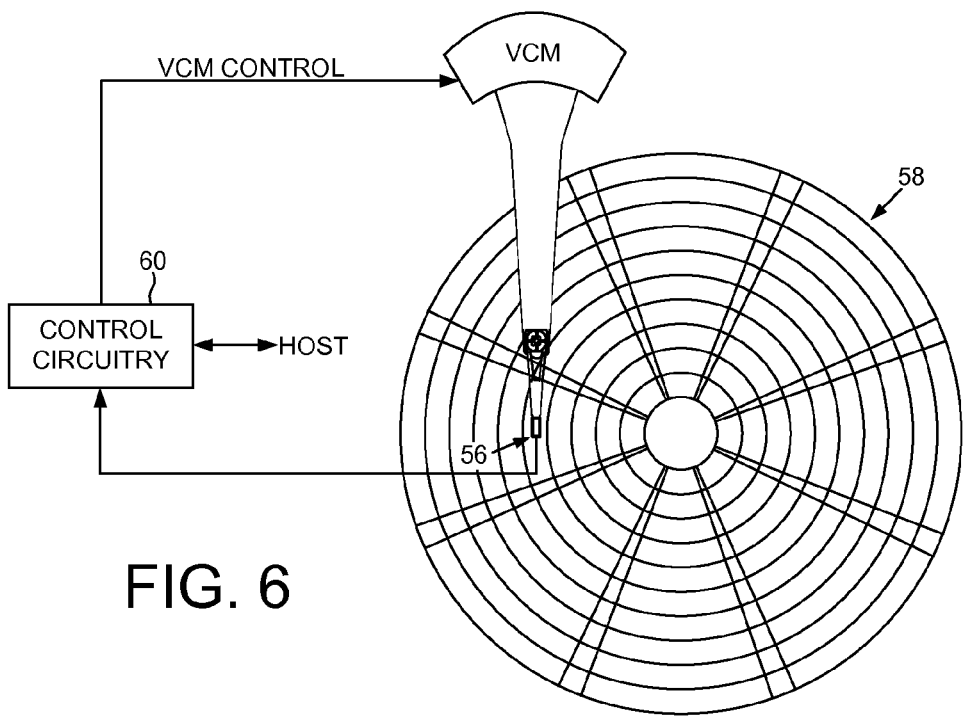
FIG. 6 shows an embodiment of the present invention wherein the non-volatile memory comprises a non-volatile semiconductor memory of a solid state drive.
Figure 7:
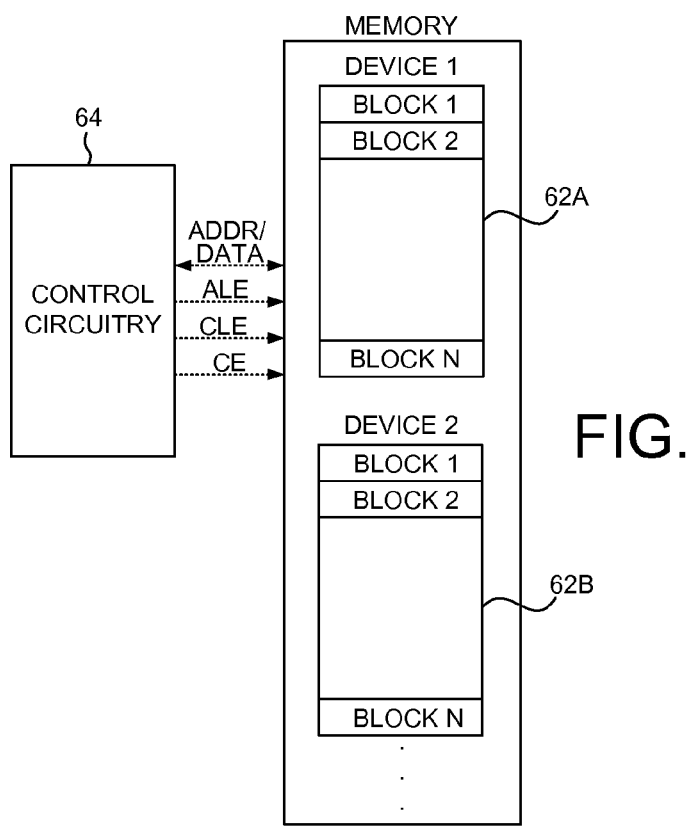
FIG. 7 shows an embodiment of the present invention wherein the non-volatile memory comprises a disk of a disk drive.

The embodiments of the present invention may be employed in any suitable data storage system. FIG. 6 shows a data storage system comprising a disk drive including a head 56 actuated over a disk 58 and control circuitry 60 for implementing the embodiments described herein. FIG. 7 shows a solid state drive comprising a plurality of non-volatile semiconductor memories 62A, 62B, etc., such as flash memories, and control circuitry 64 for implementing the embodiments described herein. A hybrid data storage system may also be employed comprising components of a disk drive shown in FIG. 6 combined with the non-volatile semiconductor memories shown in FIG. 7.

The control circuitry in the data storage device may comprise any suitable circuitry such as a microprocessor executing code segments stored on any suitable computer readable storage medium (e.g., semiconductor memory, disk, etc.). In other embodiments, the control circuitry may comprise dedicated state machine circuitry implemented in a suitable application specific integrated circuit (ASIC). In yet other embodiments, the control circuitry may comprise a microprocessor executing code segments together with dedicated state machine and/or other dedicated logic circuitry implemented in an integrated circuit.

What is claimed is:

1. A data storage device comprising:
a non-volatile memory comprising a plurality of memory segments; and control circuitry operable to:
receive a write command comprising a first logical block address (LBA) and first user data, and a second LBA and second user data;
map the first LBA to a first physical block address (PBA) for addressing a first memory segment;
map the second LBA to a second PBA for addressing a second memory segment;
generate first redundancy in response to the first user data;
generate second redundancy in response to the second user data;
generate parity data in response to the first and second user data;
generate third redundancy in response to:
at least one of the first LBA and the first PBA; and
at least one of the second LBA and the second PBA; and
write the first and second user data and parity data to the non-volatile memory and write the first, second, and third redundancy to the non-volatile memory.

2. The data storage device as recited in claim 1, wherein the control circuitry is operable to:
generate the first redundancy in response to the first user data and at least one of the first LBA and the first PBA; and
generate the second redundancy in response to the second user data and at least one of the second LBA and the second PBA.

3. The data storage device as recited in claim 2, wherein the control circuitry is operable to generate the third redundancy in response to the first redundancy and the second redundancy.

4. The data storage device as recited in claim 1, wherein the control circuitry is further operable to:
receive a read command comprising the first and second LBAs;
read the first user data and first redundancy from the non-volatile memory;
correct errors in the first user data using the first redundancy;
read the second user data and second redundancy from the non-volatile memory;
correct errors in the second user data using the second redundancy; and
when the second user data is uncorrectable using the second redundancy:

read the parity data and the third redundancy from the non-volatile memory;
verify the parity data using the third redundancy; and
regenerate the second user data using the first user data and the parity data.

5. The data storage device as recited in claim 4, wherein the control circuitry is operable to:
generate the first redundancy in response to the first user data and at least one of the first LBA and the first PBA;
generate the second redundancy in response to the second user data and at least one of the second LBA and the second PBA;
correct the first user data in response to the first redundancy and at least one of the first LBA and the first PBA; and
correct the second user data in response to the second redundancy and at least one of the second LBA and the second PBA.

6. The data storage device as recited in claim 1, wherein the control circuitry is operable to:
combine the first and second LBAs to generate metadata; and
generate the third redundancy in response to the parity data and the metadata.

7. The data storage device as recited in claim 6, wherein the control circuitry is operable to:
combine the first and second LBAs to regenerate the metadata; and
verify the parity data using the third redundancy and the regenerated metadata.

8. The data storage device as recited in claim 1, wherein the control circuitry is operable to:
combine the first and second PBAs to generate metadata; and
generate the third redundancy in response to the parity data and the metadata.

9. The data storage device as recited in claim 8, wherein the control circuitry is operable to:
combine the first and second PBAs to regenerate the metadata; and
verify the parity data using the third redundancy and the regenerated metadata.

10. The data storage device as recited in claim 1, wherein the control circuitry is operable to generate the third redundancy in response to:
at least one of the first LBA and the first PBA;
at least one of the second LBA and the second PBA; and
at least one of a third LBA and a third PBA for storing the parity data to a third memory segment.

11. A method of operating a data storage device comprising a non-volatile memory comprising a plurality of memory segments, the method comprising:
receiving a write command comprising a first logical block address (LBA) and first user data, and a second LBA and second user data;
mapping the first LBA to a first physical block address (PBA) for addressing a first memory segment;
mapping the second LBA to a second PBA for addressing a second memory segment;
generating first redundancy in response to the first user data;
generating second redundancy in response to the second user data;
generating parity data in response to the first and second user data;
generating third redundancy in response to:
at least one of the first LBA and the first PBA; and
at least one of the second LBA and the second PBA; and
writing the first and second user data and parity data to the non-volatile memory and write the first, second, and third redundancy to the non-volatile memory.

12. The method as recited in claim 11, further comprising:
generating the first redundancy in response to the first user data and at least one of the first LBA and the first PBA; and
generating the second redundancy in response to the second user data and at least one of the second LBA and the second PBA.

13. The method as recited in claim 12, further comprising generating the third redundancy in response to the first redundancy and the second redundancy.

14. The method as recited in claim 11, further comprising:
receiving a read command comprising the first and second LBAs;
reading the first user data and first redundancy from the non-volatile memory;
correcting errors in the first user data using the first redundancy;
reading the second user data and second redundancy from the non-volatile memory;
correcting errors in the second user data using the second redundancy; and
when the second user data is uncorrectable using the second redundancy:
reading the parity data and the third redundancy from the non-volatile memory;
verifying the parity data using the third redundancy; and
regenerating the second user data using the first user data and the parity data.

15. The method as recited in claim 14, further comprising:
generating the first redundancy in response to the first user data and at least one of the first LBA and the first PBA;
generating the second redundancy in response to the second user data and at least one of the second LBA and the second PBA;
correcting the first user data in response to the first redundancy and at least one of the first LBA and the first PBA; and
correcting the second user data in response to the second redundancy and at least one of the second LBA and the second PBA.

16. The method as recited in claim 11, further comprising:
combining the first and second LBAs to generate metadata; and
generating the third redundancy in response to the parity data and the metadata.

17. The method as recited in claim 16, further comprising:
combining the first and second LBAs to regenerate the metadata; and
verifying the parity data using the third redundancy and the regenerated metadata.

18. The method as recited in claim 11, further comprising:
combining the first and second PBAs to generate metadata; and
generating the third redundancy in response to the parity data and the metadata.

19. The method as recited in claim 18, further comprising:
combining the first and second PBAs to regenerate the metadata; and
verifying the parity data using the third redundancy and the regenerated metadata.

20. The method as recited in claim 11, further comprising generating the third redundancy in response to:
at least one of the first LBA and the first PBA;
at least one of the second LBA and the second PBA; and at least one of a third LBA and a third PBA for storing the parity data to a third memory segment.

* * * * *